(12) United States Patent
Levinshtein et al.

(10) Patent No.: US 10,872,272 B2
(45) Date of Patent: Dec. 22, 2020

(54) SYSTEM AND METHOD USING MACHINE LEARNING FOR IRIS TRACKING, MEASUREMENT, AND SIMULATION

(71) Applicant: L'OREAL, Paris (FR)

(72) Inventors: Alex Levinshtein, Thornhill (CA); Edmund Phung, Toronto (CA); Parham Aarabi, Richmond Hill (CA)

(73) Assignee: L'OREAL, Paris (FR)

( * ) Notice: Subject to any disclaimer, the term of this patent is extended or adjusted under 35 U.S.C. 154(b) by 261 days.

(21) Appl. No.: 15/952,732

(22) Filed: Apr. 13, 2018

(65) Prior Publication Data
US 2018/0300589 A1 Oct. 18, 2018

Related U.S. Application Data

(60) Provisional application No. 62/485,108, filed on Apr. 13, 2017.

(51) Int. Cl.
*G06K 9/62* (2006.01)
*G06K 9/00* (2006.01)
(Continued)

(52) U.S. Cl.
CPC ........... *G06K 9/6262* (2013.01); *G06F 3/012* (2013.01); *G06F 3/013* (2013.01); *G06K 9/0061* (2013.01); *G06K 9/00268* (2013.01); *G06K 9/00604* (2013.01); *G06K 9/00617* (2013.01); *G06K 9/6282* (2013.01); *G06T 7/73* (2017.01);
(Continued)

(58) Field of Classification Search
None
See application file for complete search history.

(56) References Cited

U.S. PATENT DOCUMENTS

2016/0350611 A1\* 12/2016 Zhang ................ G06K 9/00288
2017/0206694 A1\* 7/2017 Jiao .......................... G06T 13/40
(Continued)

OTHER PUBLICATIONS

Wei, C.—"Combining Shape Regression Model and Isophotes Curvature Information for Eye Center Localization"—IEEE 2014, pp. 156-160 (Year: 2014).\*
(Continued)

*Primary Examiner* — Bernard Krasnic
(74) *Attorney, Agent, or Firm* — Oblon, McClelland, Maier & Neustadt, L.L.P.

(57) ABSTRACT

This document relates to hybrid eye center localization using machine learning, namely cascaded regression and hand-crafted model fitting to improve a computer. There are proposed systems and methods of eye center (iris) detection using a cascade regressor (cascade of regression forests) as well as systems and methods for training a cascaded regressor. For detection, the eyes are detected using a facial feature alignment method. The robustness of localization is improved by using both advanced features and powerful regression machinery. Localization is made more accurate by adding a robust circle fitting post-processing step. Finally, using a simple hand-crafted method for eye center localization, there is provided a method to train the cascaded regressor without the need for manually annotated training data. Evaluation of the approach shows that it achieves state-of-the-art performance.

22 Claims, 7 Drawing Sheets

(51) Int. Cl.
*G06T 7/73* (2017.01)
*G06F 3/01* (2006.01)
(52) U.S. Cl.
CPC ............... *G06T 2207/10024* (2013.01); *G06T 2207/20081* (2013.01); *G06T 2207/30201* (2013.01)

(56) References Cited

U.S. PATENT DOCUMENTS

2018/0211096 A1* 7/2018 Cao .................... G06K 9/00268
2019/0318160 A1* 10/2019 Nozue ................ G06K 9/00281

OTHER PUBLICATIONS

Pang, Z.—"Robust Eye Center Localization through Face Alignment and Invariant Isocentric Patterns"—PLOS One 2015, pp. 1-19 (Year: 2015).*
Karan Ahuja et al.; Eye Center Localization and Detection Using Radial Mapping; Article; 2016; 5 Pages; India.
Evangelos Skodras et al.; An Accurate Eye Center Localization Method for Low Resolution Color Imagery; Article; 2012; 4 Pages; Greece.
Anjith George et al.; Fast and Accurate Algorithm for Eye Localization for Gaze Tracking in Low Resolution Images; Article; May 17, 2016; 12 Pages.
Wolfgang Fuhl et al.; ElSe: Ellipse Selection for Robust Pupil Detection in Real-World Environments; Article; Mar. 14-17, 2016; 8 Pages; Charleston, SC, USA.
Wolfgang Fuhl et al.; Evaluation of State-of-the-Art Pupil Detection Algorithms on Remote Eye Images; Article; 10 Pages; Germany, 2016.
Wolfgang Fuhl et al.; ExCuSe: Robust Pupil Detection in Real-World Scenarios; Article; 12 Pages; Germany, 2015.
Dan Witzner Hansen et al.; Eye Tracking in the Wild; Article; 2004; 27 Pages; Denmark.
Erroll Wood et al.; Eyetab: Model-Based Gaze Estimation on Unmodified Tablet Computers; Article; 4 Pages; United Kingdom and Germany, 2014.
Nenad Markus et al.; Eye Pupil Localization With an Ensemble of Randomized Trees; Article; 2014; 22 Pages.
Roberto Valenti et al.; Accurate Eye Center Location Through Invariant Isocentric Patterns; Article; 2011; 14 Pages; Amsterdam, The Netherlands.

Dan Witzner Hansen et al.; In the Eye of the Beholder: A Survey of Models for Eyes and Gaze; Article; Jan. 23, 2009; 42 Pages.
Evangelos Skodras et al.; On Visual Gaze Tracking Based on a Single Low Cost Camera; Article; Dec. 10, 2015; 16 Pages.
Evangelos Skodras et al.; Precise Localization of Eye Centers in Low Resolution Color Images; Article; Dec. 18, 2014; 14 Pages; Greece.
Dongheng Li et al.; Starburst: A Hybrid Algorithm for Video-Based Eye Tracking Combining Feature-Based and Model-Based Approaches; Article; 8 Pages; Ames, Iowa, USA, 2005.
Lech Swirski et al.; Robust Real-Time Pupil Tracking in Highly Off-Axis Images; Article; 4 Pages; Cambridge, United Kingdom, 2012.
Dong Tian et al.; An Accurate Eye Pupil Localization Approach Based on Adaptive Gradient Boosting Decision Tree; Article; 2016; 4 Pages; China.
Fabian Timm et al.; Accurate Eye Centre Localisation by Means of Gradients; Article; 6 Pages; Germany, 2011.
Mingcai Zhou et al.; Precise Eye Localization With Improved SDM; Article; 2015; 5 Pages; Beijing, China and Suwon-Si, Korea.
Xucong Zhang et al.; Appearance-Based Gaze Estimation in the Wild; Article; 10 Pages; Saarbrucken, Germany, 2015.
Xuehan Xiong et al.; Supervised Descent Method and Its Applications to Face Alignment; Article; 8 Pages; Pittsburgh, PA, USA 2013.
Shaoqing Ren et al.; Face Alignment at 3000 FPS Via Regressing Local Binary Features; Article; 8 Pages; China, 2014.
Vahid Kazemi et al.; One Millisecond Face Alignment With an Ensemble of Regression Trees; Article; 8 Pages; Stockholm, Sweden, 2014.
Xudong Cao et al.; Face Alignment by Explicit Shape Regression; Article; Dec. 13, 2013; 14 Pages; Beijing, China.
Antonakos et al.; (2015) Feature-Based Lucas-Kanade and Active Appearance Models; Article; 17 Pages.
Piotr Dollar et al.; Integral Channel Features; Article; 2009; 11 Pages; USA.
Tsuyoshi Kawaguchi et al.; Detection of Eyes From Human Faces by Hough Transform and Separability Filter; Article; 2000; 4 Pages; Oita, Japan.
John Daugman; How Iris Recognition Works; Article; 10 Pages; Cambridge, United Kingdom, 2004.
Klaus D. Toennies et al.; Feasibility of Hough-Transform-Based Iris Localisation for Real-Time-Applications; Article; 4 Pages; Germany, 2002.

* cited by examiner

SYSTEM AND METHOD USING MACHINE LEARNING FOR IRIS TRACKING, MEASUREMENT, AND SIMULATION

CROSS-REFERENCE

This application claims the benefit of U.S. Provisional Application No. 62/485,108 filed Apr. 13, 2017, the contents of which are incorporated herein by reference.

FIELD

This application relates to machine learning and processing including systems and methods for computer automated detection of facial features, particularly eye center localization in faces captured in video frames or other images.

BACKGROUND

Eye center localization is important for a variety of practical applications, such as eye tracking, iris recognition, and more recently augmented reality applications. While some techniques require the use of specialized head-mounts or active illumination, such machinery is expensive and is not applicable in many cases. Eye center localization using a standard camera may be desired. Approaches for eye center localization can be divided into two categories. The first, predominant, category consists of hand-crafted model fitting methods. These techniques employ the appearance, such as the darkness of the pupil, and/or the circular shape of the pupil and the iris for detection [3, 9, 10, 11, 15, 18, 19, 21, 23, 24]. These methods are typically accurate but often lack robustness in more challenging settings, such as low resolution or noisy images and poor illumination. More recently, a second category emerged—machine learning based methods. While there are approaches that train sliding window eye center detectors, recent success of cascaded regression for facial feature alignment [6, 17, 14, 25] has prompted the community to apply these methods for eye center localization [16, 20, 27]. These new methods have proven to be more robust, but they lack the accuracy of the model fitting approaches and require annotated training data which may be cumbersome to obtain.

SUMMARY

This document relates to improving the operations of a computer or another technology in the processing of facial images, providing specific solutions to specific problems relating to eye center localization resulting in technological improvements. Machine learning techniques are described to improve computer operations, for example to define a model or engine from training data which predicts a desired target variable such as eye center location from a set of observable variables.

More particularly, this document relates to hybrid eye center localization using machine learning, namely cascaded regression and hand-crafted model fitting. There are proposed systems and methods of eye center (iris) detection using a cascade regressor (cascade of regression forests) (machine learning) as well as systems and methods for training a cascaded regressor. For detection, the eyes are detected using a facial feature alignment method. The robustness of localization is improved by using both advanced features and powerful regression machinery. Localization is made more accurate by adding a robust circle fitting post-processing step. Finally, using a simple hand-crafted method for eye center localization, there is provided a method to train the cascaded regressor without the need for manually annotated training data. Evaluation of the approach shows that it achieves state-of-the-art performance (e.g. on the BioID, GI4E, and the TalkingFace datasets). At an average normalized error of e<0.05, the regressor trained on manually annotated data yields an accuracy of 95.07% (BioID), 99.27% (GI4E), and 95.68% (TalkingFace). The automatically trained regressor is nearly as good, yielding an accuracy of 93.9% (BioID), 99.27% (GI4E), and 95.46% (TalkingFace).

There is disclosed a device comprising a processing unit coupled to a storage device storing instructions, which instructions, when executed by the processor, configure the device to provide components to determine eye center localization in an image source. The components comprise: a facial feature detector to detect facial features of a face in the image source, the face including a pair of eyes each having an iris; a cascade regression of forests engine (CRFE) defined in accordance with machine learning to analyze the image source, the CRFE using the facial features and successively analyzing the image source in a cascade of regression forests to determine a rough estimate of eye center localization; and a circle fitter to refine the rough estimate of eye center localization by performing a circle fitting for each iris to determine the eye center localization.

The CRFE may estimate the eye center localization of the pair of eyes jointly such that a shape S used by the CRFE comprises eye centers, the CRFE successively refining the shape S in respective levels of the cascade of regression forests, with each level in the cascade evaluating by a current regressor a respective current shape S as determine by a previous regressor in a previous level of the cascade of regression forests. A regression forest at each level of the cascade of regression forests may be defined in accordance with: extracted HoG (Histogram of oriented Gradients) features centered on each current eye center of current shape S; a respective N-dimensional feature vector defined in responsive to the HoG features; at each regression tree decision node, a generated pool of K pairwise HoG features where each pair in the generated pool is determined by random choice of an eye, two of the N-dimensions and a threshold where a binary HoG difference feature is computed as a thresholded difference between the two of the N-dimensions; and at each leaf node, a store of an updated shape vector comprising the coordinates of each eye center.

The circle fitter may perform the circle fitting, for each iris, by: defining an initial circle from a respective eye center determined by the CRFE and an initial radius; extracting candidate iris edge points from edge points adjacent to a boundary of the initial circle, the boundary defined by circle points; and fitting the circle using the candidate iris edge points. Candidate iris edge points are extracted by: restricting the extracting by examining only circle points taken from a portion of each initial circle boundary; and for each respective circle point taken, evaluating a respective score assigned to the respective circle point and respective points adjacent to the respective circle point, the respective points adjacent comprising points along a scan line centered on the respective circle point and directed toward a center of the initial circle, such that only a highest scoring point along the scan line is selected as a candidate iris edge point.

The device may be configured by the instructions to provide an image source modifying component to modify the image source in response to an iris location determined by the eye center localization; and wherein the instructions configure the device to communicate, store, and/or display the image source as modified. The source modifying component may modify the image source by changing an iris colour. The source modifying component may simulate a contact lens or other effect applied to the iris. The source modifying component may further modify one or more facial features of the face in addition to modifying one or more irises.

The instructions may configure the device to provide a gaze estimation component to determine a gaze direction of irises of the pair of eyes. The gaze estimation component may perform a gaze direction to display screen translation using the gaze direction and a distance relationship between the irises and a display screen presenting a display thereby to determine a screen location on the display screen where the irises are gazing; and the instructions may configure the device to modify at least a portion of a display about the screen location in response to the gaze detection to display screen translation.

The display screen may present a graphical user interface (GUI) and the device may operate to modify at least a portion of a display about the screen location by invoking an effect or feature of the GUI. The effect or feature may be any one or more of: an enlargement/zoom in effect; a next image selection effect; a more information selection effect; a display of an advertisement effect; and a GUI control selection or invocation effect. The gaze estimation component may provide the screen location to the GUI as input to invoke the effect or feature. The instructions may configure the device to: perform the method of eye center localization on a further plurality of image sources; detect a sufficient change in the gaze direction of the gaze; and perform at least one of stopping said modifying of the display screen and removing the effect or feature responsive to the sufficient change.

There is disclosed computer implemented method of machine learning to train a cascade regression forest engine (CRFE) for eye center localization, the method executed by a processing unit of a computing device and comprising: for each image of a set of training images: performing a facial feature alignment operation to detect facial features of a face in each image, the face including a pair of eyes each having an iris; performing a hand-crafted eye center localization operation to determine eye center localization for each image using the facial features, the hand-crafted eye center localization operation maximizing an eye center score function S(c) for each eye; annotating each image with eye location data in accordance with the facial features as detected and eye center localization data denoting eye centers in accordance with the hand-crafted eye center localization operation; and providing the set of training image to train a CRFE; wherein the eye center score function S(c) measures the agreement between vectors from a candidate center point c and underlying gradient orientation:

$$c^* = \underset{c}{\operatorname{argmax}} S(c) = \underset{c}{\operatorname{argmax}} \left\{ \frac{1}{N} \sum_{0.3E \leq \|d_i^*\| \geq 0.5E} w_c \max_c (d_i^T, g_i, 0) \right\} \quad \text{Eqn (1)}$$

where $d_i^*$ is the unnormalized vector from c to a point i; where E, is a distance between two eye corners of an eye; wherein $w_c$ is a weight of a candidate center c, such that $w_c=255-I^*(c)$, where $I^*$ is an 8-bit smoothed grayscale image; and wherein $g_i$ is a normalized image gradient at i.

There is disclosed a computer implemented method to determine eye center localization in an image source, the method executed by a processing unit of a computing device and comprising: detecting facial features of a face in the image source, the face including a pair of eyes each having an iris; analyzing the source image by a cascade regression of forests engine (CRFE), the CRFE using the facial features and successively analyzing the image source in a cascade of regression forests to determine a rough estimate of eye center localization; and refining the rough estimate of eye center localization by performing a circle fitting for each iris to determine the eye center localization.

There is disclosed a computer implemented method to modify an image source, the method executed by a processing unit of a computing device and comprising: performing eye center localization using the image source in accordance with any one of methods claimed herein; modifying the image source in response to an iris location determined by the localization; and communicating, storing, and/or displaying the image source as modified.

There is disclosed a computer implemented method of gaze detection, the method executed by a processing unit of a computing device and comprising: performing eye center localization on a plurality of image sources, in accordance with any one of the methods claims herein; and performing gaze estimation to determine a gaze direction of the irises.

There are disclosed computing device aspects where one or more processing units execute instructions stored by a storage device to perform any of the method aspects herein. Computer storage devices (non-transient) may store instructions to configure the execution of one or more processing units of a computing device for example to perform any of the disclosed methods.

DETAILED DESCRIPTION

A novel eye center detection method is proposed that combines the strengths of the aforementioned categories with further novel and inventive features. In the literature on facial feature alignment, there are two types of cascaded regression methods, simple cascaded linear regressors using complex features such as Scale Invariant Feature Transform (SIFT) or Histogram of oriented Gradients (HoG) [4, 25] and more complex cascaded regression forests using simple pairwise pixel difference features [6, 14]. A first new aspect described herein provides a new method for eye center localization that employs complex features and complex regressors. It outperforms simple regressors with complex features [27] and complex regressors with simple features

[16, 20]. Similar to [16, 20] the new method is based on cascaded regression trees, but unlike these authors, following [6, 17, 14, 25], the features for each cascade are anchored to the current eye center estimates. Moreover, based on the pedestrian detection work of Dollar et al. [8] there is employed more powerful gradient histogram features rather than simple pairwise pixel differences. Finally, while the aforementioned eye center regressors bootstrap the regression using face or eye detectors, given the success of facial feature alignment methods, accurate eye contours are used to initialize the regressor and normalize feature locations. The resulting method achieves state-of-the-art performance on BioID [1], GI4E [5], and TalkingFace [2] datasets.

The proposed cascaded regression approach is robust, but suffers from the same disadvantages of other discriminative regression-based methods. Namely, it is relatively inaccurate and requires annotated training data. To make the proposed approach more accurate, in a second aspect, the regressor estimate is refined by adding a circle fitting post-processing step. Robust estimation and prior knowledge of iris size is employed to facilitate sub-pixel accuracy eye center detection. The benefit of this refinement step is illustrated by evaluating the approach on GI4E [5] and TalkingFace [2] datasets, as well as performing qualitative evaluation.

In a third aspect, rather than training the new cascade regressor on manually generated annotations, a hand-crafted method is employed to generate annotated data automatically. Combining recent advances of eye center and iris detection methods, a new hand-crafted eye center localization method is built. Despite the noisy annotations generated by the hand-crafted algorithm, the resulting regressor trained on these annotation is shown to be nearly as good as the regressor trained on manually annotated data. What is even more unexpected is that the regressor performs much better than the hand-crafted method used for training data annotation.

Figure 1:
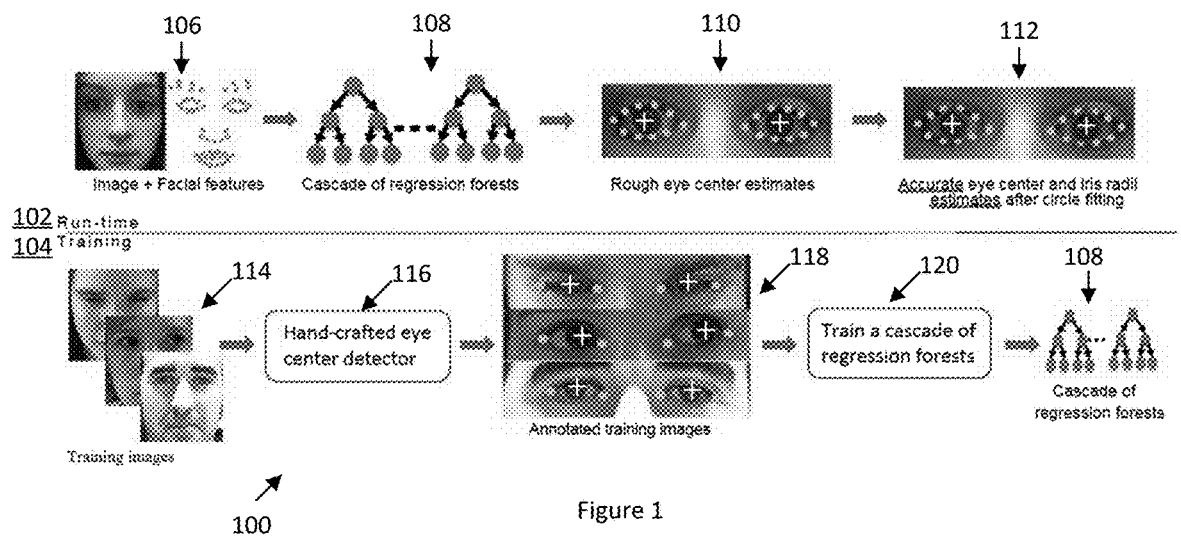
FIG. 1 is a schematic method flow overview.

In summary, this disclosure proposes a new method (and related aspects) for eye center localization and has three main contributions that are shown in FIG. 1. FIG. 1 is a pictorial flowchart 100 showing two sets of operations in a top chart 102 of run-time operations and bottom chart 104 of training operations. First, in chart 102 a novel cascaded regression framework 108 using images with facial features 106 is presented for eye center localization, leading to increased robustness. Second, a circle fitting step 112 is utilized, leading to eye center localization with sub-pixel accuracy from the rough estimates 110 produced from 108. Finally, by employing a hand-crafted eye center detector 116 on training images 114 the regressor 108 can be trained 120 using the annotated training images 118 from 116 without the need for manually annotated training data.

The majority of eye center localization methods are hand-crafted approaches and can be divided into shape and appearance based methods. In the iris recognition literature there are also many segmentation based approaches, such as methods that employ active contours. An extensive overview is given by Hansen and Li [12]. Shape-based techniques make use of the circular or elliptical nature of the iris and pupil. Early methods attempted to detect irises or pupils directly by fitting circles or ellipses. Many techniques have roots in the iris recognition and are based on the integrodifferential operator [7]. Others, such as Kawaguchi et al. [13], use blob detection to extract iris candidates and use Hough transform to fit circles to these blobs. Toennies et al. [22] also employ generalized Hough transform to detect irises, but assume that every pixel is a potential edge point and cast votes proportional to gradient strength. Li et al. [15] propose the Startburst algorithm, where rays are iteratively cast from the current pupil center estimate to detect pupil boundaries and RANSAC (RANdom SAmple Concenus) is used for robust ellipse fitting.

Recently, some authors focused on robust eye center localization without an explicit segmentation of the iris or the pupil. Typically, these are either voting or learning-based approaches. The method of Timm and Barth [21] is a popular voting based approach where pixels cast votes for the eye center based on agreement in the direction of their gradient with the direction of radial rays. A similar voting scheme is suggested by Valenti and Gevers [23], who also cast votes based on the aforementioned alignment but rely on isophote curvatures in the intensity image to cast votes at the right distance. Skodras and Fakotakis [18] propose a similar method but use color to better distinguish between the eye and the skin. Ahuja et al. [3] improve the voting using radius constraints, better weights, and contrast normalization.

The next set of methods are multistage approaches that first robustly detect the eye center and then refine the estimate using circle or ellipse fitting. 'Swirski et al. [19] propose to find the pupil using a cascade of weak classifiers based on Haar-like features combined with intensity-based segmentation. Subsequently, an ellipse is fit to the pupil using RANSAC. Wood and Bulling [24], as well as George and Routray [11], have a similar scheme but employ a voting-based approach to get an initial eye center estimate. Fuhl et al. propose the Excuse [9] and Else [10] algorithms. Both methods use a combination of ellipse fitting with appearance-based blob detection.

While the above methods are accurate, they still lack robustness in challenging in-the-wild scenarios. The success of discriminative cascaded regression for facial feature alignment prompted the use of such methods for eye center localization. [16, 20] start by detecting the face and initializing the eye center estimates using anthropometric relations. Subsequently, they use a cascade of regression forests with binary pixel difference features to estimate the eye centers. Inspired by the recent success of the Supervised Descent Method (SDM) method for facial feature alignment Zhou et al. [27] propose a similar method for eye center localization. Unlike the original SDM work, their regressor is based on a combination of SIFT and Local Binary Patterns (LBP) features. Moreover, unlike [16, 20] who regress individual eye centers, Zhou et al. estimate a shape vector that includes both eye centers and eye contours. In line with this trend we develop a new regression-based eye center estimator, but additionally employ circle-based refinement and voting-based techniques to get an accurate detector that is easy to train.

Eye Center Localization

In this section, we describe our three main contributions in detail. We start by introducing our cascaded regression framework for eye center localization ("Cascaded regression framework"). Next, we show how the eye center estimate can be refined with a robust circle fitting step by fitting a circle to the iris ("Iris refinement by robust circle fitting"). The section "Using a hand-crafted detector for automatic annotations" explains how to train the regressor without manually annotated eye center data by using a hand-crafted method for automatic annotation. Finally, in "Handling closed eyes" we discuss our handling of closed or nearly closed eyes.

Cascaded Regression Framework

Inspired by the face alignment work in [6, 14], we build an eye center detector using a cascade of regression forests.

A cascade regressor contains a sequence of regressors where each regressor in the sequence analyzes some features and outputs a regression result. In the present instance, the features are HoG features and the regression result is a shape update. Regressors further up in the chain are effectively correcting the mistakes of regressors before them.

A cascade of regression forests means that every regressor in the cascade is a forest (i.e., multiple regression trees). There are different ways of combining trees in the forest. In the present instance, each forest is a cascade of regression trees. Each regression tree in the cascade consists of binary decision nodes. At run time the tree is traversed, and the success or failure of tests in each decision node determines whether the traversal continues with the left or the right subtree. The traversal process concludes when a leaf node is reached, which contains the regression target. As described further herein, the test in each node consists of a thresholded difference between two HoG channels and the leafs store the shape vector (the coordinates of both iris centers).

The shape is represented by a vector $S=(x_R^T, x_L^T)$, where $x_R$, $x_L$ are the coordinates of right and left eye centers respectively. Starting from an initial estimate $S^0$, the shape is refined using a cascade of regression forests:

$$S^{t+1} = S^t + r_t(I, S^t), \qquad \text{Eqn (2)}$$

where $r_t$ is the $t^{th}$ regressor in the cascade estimating the shape update given the image I and the current shape estimate $S^t$. Next, there is described the choice of image features, regression machinery, and the mechanism for obtaining an initial shape estimate $S^0$.

For our choice of image features, similar to Dollar et al. [8], HoG features anchored to the current shape estimate are utilized. It was found that using HoG is especially helpful for bright eyes, where variation in appearance due to different lighting and image noise is more apparent, hurting the performance of regressors employing simple pixel difference features. Zhou et al. [27], also employ advanced image features, but in contrast, in the present instance there is used regression forests at each level of our cascade. Finally, while [16, 20] estimate eye center positions independently, due to the large amount of correlation between the two eyes, it is found that it is beneficial to estimate both eyes jointly. In [27], the shape vector consists of eye centers and their contours. However, since it is possible to change gaze direction without a change in eye contours, the shape vector S includes only the two eye center points.

Figure 2:
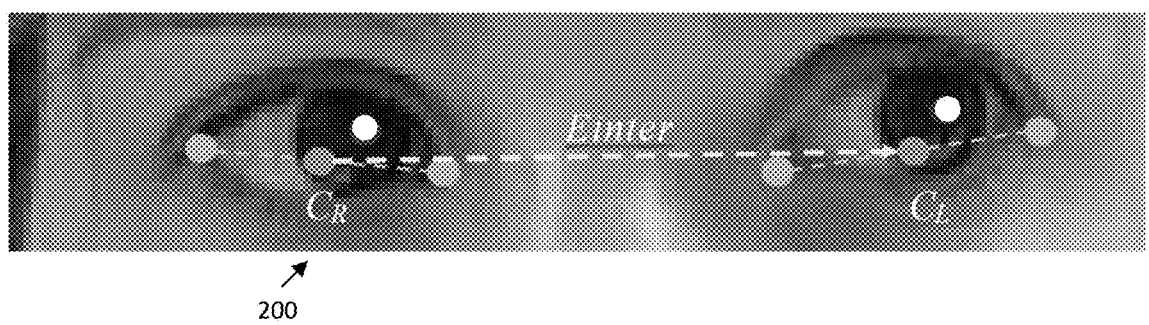
FIG. 2 is an annotated image showing normalized eye center locations.

To get an initial shape estimate, existing approaches use eye detectors or face detectors with anthropometric relations to extract the eye regions. Instead, in the present instance there is employed a facial feature alignment method to get an initial shape estimate and anchor features. Specifically, the four eye corners are used to construct a normalized representation of shape S. Eye center coordinates $c_R$ and $c_L$ are defined to be the center points between the corners of the right and left eyes respectively. The vector $E_{inter}$ between the two eye centers is defined as the interocular vector with its magnitude $\|E_{inter}\|$ defined as the interocular distance. FIG. 2 illustrates this geometry on an annotated photograph of a pair of eyes 200. The eye center coordinates are normalized such that the vector $E_{inter}$ between the two eye centers ($c_R$ and $c_L$) map to the vector $(1, 0)^T$. The similarity transformation $T(x)$ maps points from image to face-normalized coordinates and is defined to be the transformation mapping $E_{inter}$ to a unit vector aligned with the X axis with the $c_R$ mapped to the origin. Therefore, the shape vector S consists of two normalized eye centers $x_R = T(x_R^{image})$ and $x_L = T(x_L^{image})$ with $x_R^{image}$ and $x_L^{image}$ being the eye center estimates in the image. The eye center estimates $c_R$ and $c_L$ are also used to define the initial shape $S^0 = (T(c_R)^T, T(c_L)^T)$.

At each level of the cascade, HoG features are extracted, centered at the current eye center estimates. To make HoG feature extraction independent of the face size, the image is scaled by a factor $$s = \frac{E_{hog}}{\|E_{inter}\|},$$

where $E_{hog}$ is the constant interocular distance used for HoG computation. Using bilinear interpolation, there is extracted W×W patches centered at the current eye center estimates $s\,T^{-1}(x_R)$ and $s\,T^{-1}(x_L)$, with $W = 0.4 E_{hog}$. Both patches are split into 4×4 HoG cells with 6 oriented gradient histogram bins per cell. The cell histograms are concatenated and the resulting vector normalized to a unit L2 norm, yielding a 96 dimensional feature vector for each eye. Instead of using these features directly at the decision nodes of regression trees, we use binary HoG difference features. Specifically, at each decision node we generate a pool of K (K=20) in the present implementation) pairwise HoG features by randomly choosing an eye, two of the 96 HoG dimensions, and a threshold. The binary HoG difference feature is defined as the thresholded difference between the chosen pairwise HoG features. During training, the feature that minimizes the regression error is selected.

To train the cascaded regressor, there is used a dataset of annotated images with eye corners and centers. To model the variability in eye center locations Principal Components Analysis (PCA) was used in the present implementation. Using a simple form of Procrustes Analysis, each training shape is translated to the mean shape and the resulting shapes are used to build a PCA basis. Subsequently, for each training image, multiple initial shapes $S^0$ are sampled by generating random PCA coefficients, centering the resulting shape at the mean, and translating both eyes by the same random amount. The random translation vector is sampled uniformly from the range $[-0.1, 0.1]$ in X and $[-0.03, 0.03]$ in Y. The remaining parameters of the regressor are selected using cross validation. Currently, the regressor of the present implementation has 10 levels with 200 depth-4 trees per level. Each training image is oversampled 50 times. The regressor is trained using gradient boosting, similar to [14], with the learning rate parameter set to $v=0.1$. Further description of the training dataset according to one embodiment is set forth below in "Using a hand-crafted detector for automatic annotations".

Iris Refinement by Robust Circle Fitting

We refine the eye center position from the regressor by fitting a circle to the iris. Our initial circle center is taken from the regressor and the radius estimate $r_{init}$ starts with a default of $0.1 \|E_{inter}\|$. The iris is refined by fitting a circle to the iris boundaries. To that end, assuming the initial circle estimate is good enough, we extract edge points that are close to the initial circle boundary as candidates for the iris boundary.

Figure 3:
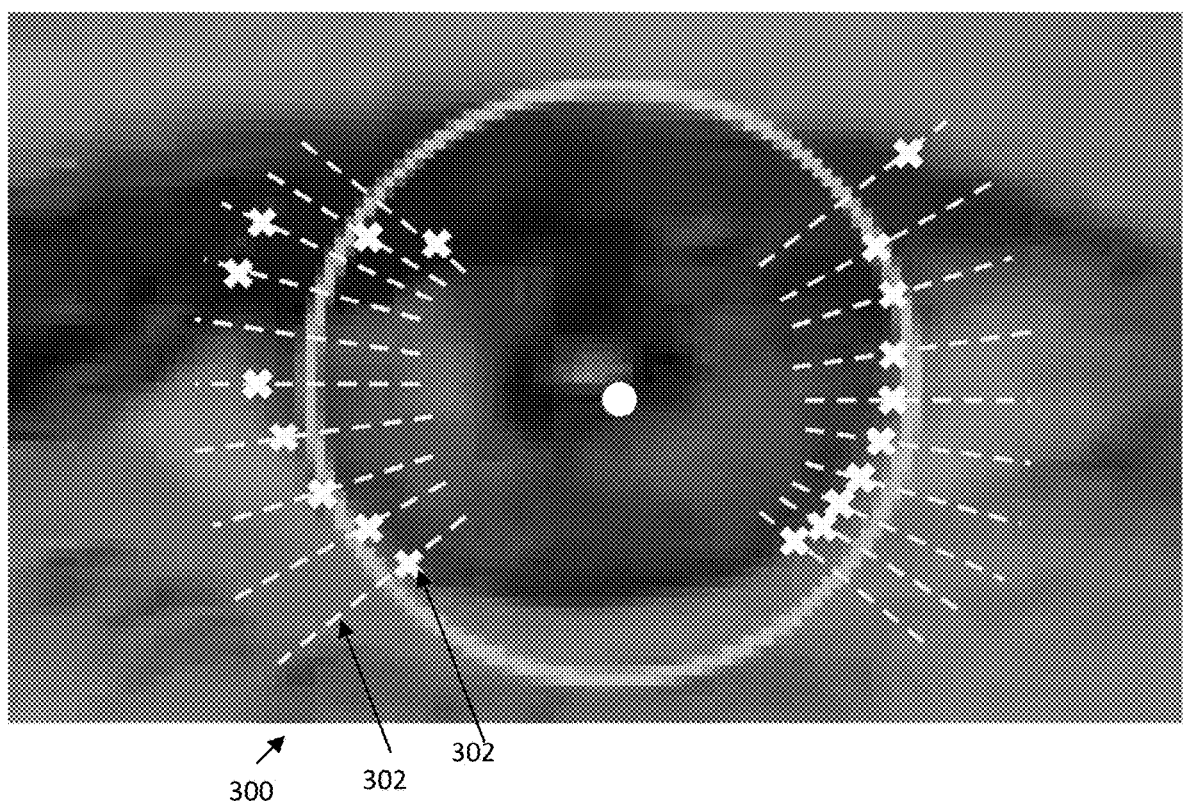
FIG. 3 is an annotated image showing robust circle fitting for iris refinement.

Employing the eye contours once again, we start by sampling N points on the circle and removing the points that lie outside the eye mask. To avoid extracting the eyelid edges we only consider circle samples in range ±45° and [135°, 225°]. For each circle point sample we form a scan line centered on that point and directed toward the center of the circle. The scan line is kept short (±30% of the circle radius) to avoid extracting spurious edges. Each point on the scan line is assigned a score equal to the dot product between the gradient and outwards-facing circle normal. The highest scoring point location is stored. Points for which the angle between the gradient and the normal is above 25° are not being considered. This process results in a list of edge points (see FIG. 3 showing an annotated photograph of an eye 300). Starting from an initial iris estimate, short scan lines (e.g. 302 perpendicular to the initial circle are used to detect candidate iris boundaries (x) (e.g. 304). A robust circle fitting method is then used to refine the estimate.

Given the above edge points $\{e_i\}_{i=1}^N$, the circle fitting cost is defined as follows:

$$C(a,b,r) = \Sigma_{i=1}^N (\sqrt{(e_{ix}-a)^2 + (e_{iy}-b)^2} - r)^2 \quad \text{Eqn (3)}$$

where (a, b) is the circle center and r is the radius. However, this cost is not robust to outliers nor are any priors for circle location and size being considered. Thus, we modify the cost to the following:

$$C_2 = w_1 \frac{1}{N} \sum_{i=1}^N \rho\left(\sqrt{(e_{ix}-a)^2 + (e_{iy}-b)^2} - r\right) + \quad \text{Eqn (4)}$$
$$w_2 \cdot (a-a_0)^2 + w_2 \cdot (b-b_0)^2 + w_3 \cdot (r-r_{default})^2.$$

Note that the squared cost in the first term was converted to a robust cost (we chose ρ to be the Tukey robust estimator function). The rest are prior terms, where $(a_0, b_0)$ is the center estimate from the regressor and $r_{default} = 0.1 \|E_{inter}\|$. We set the weights to $w_1=1$, $w_2=0.1$, $w_3=0.1$ and minimize the cost using the Gauss-Newton method with iteratively re-weighted least squares. The minimization process terminates if the relative change in cost is small enough or if a preset number of iterations (currently 30) was exceeded. For the Tukey estimator, we start by setting its parameter $C=0.3r_{init}$ and decrease it to $C=0.1r_{init}$ after initial convergence.

Using a Hand-Crafted Detector for Automatic Annotations

As mentioned, there are a variety of hand-crafted techniques for eye center localization. Some methods work well in simple scenarios but are still falling short in more challenging cases. In this section, we construct our own hand-crafted method for eye center localization and use it to automatically generate annotations for a set of training images. The resulting annotations can be considered as noisy training data. One can imagine similar data as the output of a careless human annotator. We then train the cascaded regressor from "Cascaded regression framework" on this data. Since the output of the regressor is a weighted average of many training samples, it naturally smoothes the noise in the annotations and yields better eye center estimates than the hand-crafted method used to generate the annotations. Next, we describe the approach in more detail.

Our hand-crafted eye center localization method is based on the work of Timm and Barth [21]. Since we are looking for circular structures, [21] propose finding the maximum of an eye center score function S(c) that measures the agreement between vectors from a candidate center point c and underlying gradient orientation:

$$c^* = \mathrm{argmax}_c S(c) = \mathrm{argmax}_c \left\{ \frac{1}{N} \sum_{i=1}^N w_c (d_i^T g_i)^2 \right\}, \quad \text{Eqn (5)}$$

where $d_i$ is the normalized vector from c to point i and $g_i$ is the normalized image gradient at i. $w_c$ is the weight of a candidate center c. Since the pupil is dark, $w_c$ is high for dark pixels and low otherwise. Specifically, $w_c = 255 - I^*(c)$, where $I^*$ is an 8-bit smoothed grayscale image.

Similar to [3], we observe that an iris has a constrained size. More specifically, we find that its radius is about 20% of the eye size E, which we define as the distance between the two eye corners. Thus, we only consider pixels i within a certain range of c. Furthermore, the iris is darker than the surrounding sclera. The resulting score function is:

$$S(c) = \frac{1}{N} \sum_{0.3E \leq \|d_i^*\| \geq 0.5E} w_c \max_c (d_i^T, g_i, 0) \quad \text{Eqn (6)}$$

where $d_i^*$ is the unnormalized vector from c to i.

Unlike [21] that find the global maximum of the score function in Eqn 5, we consider several local maxima of our score function as candidates for eye center locations. To constrain the search, we use a facial feature alignment method to obtain an accurate eye mask. We erode this mask to avoid the effect of eye lashes and eyelids, and find all local maxima of S(c) in Eqn 6 within the eroded eye mask region whose value is above 80% of the global maximum. Next, we refine each candidate and select the best one.

Since each candidate's score has been accumulated over a range of radii, starting with a default iris radius of 0.2E, the position and the radius of each candidate is refined. The refinement process evaluates the score function in an 8-connected neighborhood around the current estimate. However, instead of summing over a range of radii as in Eqn 6, we search for a single radius that maximizes the score. Out of all the 8-connected neighbors together with the central position, we select the location with the maximum score and update the estimate. The process stops when all the 8-connected neighbors have a lower score than the central position. Finally, after processing all eye center candidates in the above fashion, we select a single highest scoring candidate. Its location and radius estimates are then refined to sub-pixel accuracy using the robust circle fitting method from "Cascaded regression framework" herein.

In the next step, we use our hand-crafted method to automatically annotate training images. Given a set of images, we run the facial feature alignment method and the hand-crafted eye center detector on each image. We annotate each image with the position of the four eye corners from the facial feature alignment method and the two iris centers from our hand-crafted detector. Finally, we train the regressor from "Cascaded regression framework" herein on this data. Below in "Evaluation" we show that the resulting regressor performs much better than the hand-crafted method on both training and test data, and performs nearly as well as a regressor trained on manually annotated images.

Handling Closed Eyes

Our algorithm has the benefit of having direct access to eye contours for estimating the amount of eye closure. To that end, we fit an ellipse to each eye's contour and use its height to width ratio r to control our algorithm flow. For r>0.3, which holds for the majority of cases we have examined, we apply both the regression and the circle fitting methods described in previous sections. For reliable circle refinement, a large enough portion of the iris boundary needs to be visible. Thus, for 0.15<r≤0.3 we only use the regressor's output. For r≤0.15 we find even the regressor to be unreliable, thus the eye center is computed by averaging the central contour points on the upper and lower eyelids.

Evaluation

We perform quantitative and qualitative evaluation of our method and compare it to other approaches. For quantitative evaluation we use the normalized error measure defined as:

$$e = \frac{1}{d}\max(e_R, e_L) \qquad \text{Eqn (7)}$$

where $e_R$, $e_L$ are the Euclidean distances between the estimated and the correct right and left eye centers, and d is the distance between the correct eye centers. When analyzing the performance, different thresholds on e are used to assess the level of accuracy. The most popular metric is the fraction of images for which e≤0.05, which roughly means that the eye center was estimated somewhere within the pupil. In our analysis we pay closer attention to even finer levels of accuracy as they may be needed for some applications, such as augmented beauty or iris recognition, where the pupil/iris need to be detected very accurately.

We use the BioID [1], GI4E [5], and TalkingFace [2] datasets for evaluation. The BioID dataset consists of 1521 low resolution (384×286) images. Images exhibit wide variability in illumination and contain several closed or nearly closed eyes. While this dataset tests the robustness of eye center detection, its low resolution and the presence of closed eyes make it less suitable to test the fine level accuracy (finer levels than e≤0.05). The GI4E and the Talking Face datasets have 1236 and 5000 high resolution images respectively and contain very few closed eye images. Thus, we find these datasets to be more appropriate for fine level accuracy evaluation.

We implement our method in C/C++ using OpenCV and DLIB libraries. Our code takes 4 ms to detect both eye centers on images from the BioID dataset using a modern laptop computer with Xeon 2.8 GHz CPU, not including the face detection and face alignment time. The majority of this time is spent on image resizing and HoG feature computation using the unoptimized code in the DLIB library and can be significantly sped up. The facial alignment method we use is based on [14] and is part of the DLIB library, but any approach could be used for this purpose. Similar to previous methods, which rely on accurate face detection for eye center estimation, we require accurate eye contours for this purpose. To that end, we implemented a simple SVM-based approach for verifying alignment. Similar to previous methods, which evaluate eye center localization only on images with detected faces, we evaluate our method only on images for which the alignment was successful. While the alignment is successful in the vast majority of cases, some detected faces do not have an accurate alignment result. After filtering out images without successful alignment we are left with 1459/1521 images (95.9%) of the BioID dataset, 1235/1236 images of the GI4E dataset, and all the 5000 frames in the Talking Face dataset.

Quantitative Evaluation

We evaluate several versions of our method. To evaluate against alternative approaches and illustrate the effect of circle refinement we evaluate a regressor trained on manually annotated data with (REG-MR) and without (REG-M) circle refinement. We also evaluate a regressor trained on automatically annotated data (REG-AR) and show how it compares to REG-MR, the hand crafted approach used to generate annotations (HO, and the competition. To evaluate the regressors trained on manual annotations we use the MPIIGaze dataset [26] for training, which has 10229 cropped out eye images with eye corners and center annotations. To test REG-AR, we need a dataset where the entire face is visible, thus we use the GI4E dataset with flipped images for training. Since GI4E is smaller than MPIIGaze, the regressor trained on it works marginally worse than the regressor trained on MPIIGaze, but nevertheless achieves state-of-the-art performance. We indicate the dataset used for training as a suffix to the method's name (-M for MPIIGaze and -G for GI4E). Reference may be made to the quantitative evaluation graphs 400 of FIG. 4 in which, in the top set of graphs there is shown an evaluation of regression-based eye center detector trained on manually annotated MPIIGaze data with (REG-MR-M) and without (REG-M-M) circle refinement. On the bottom set there is shown a comparison of automatically trained regressor (REG-AR-G) to manually trained regressor (REG-MR-G) and the hand-crafted method (HC) used to generate automatic annotations.

Figure 4:
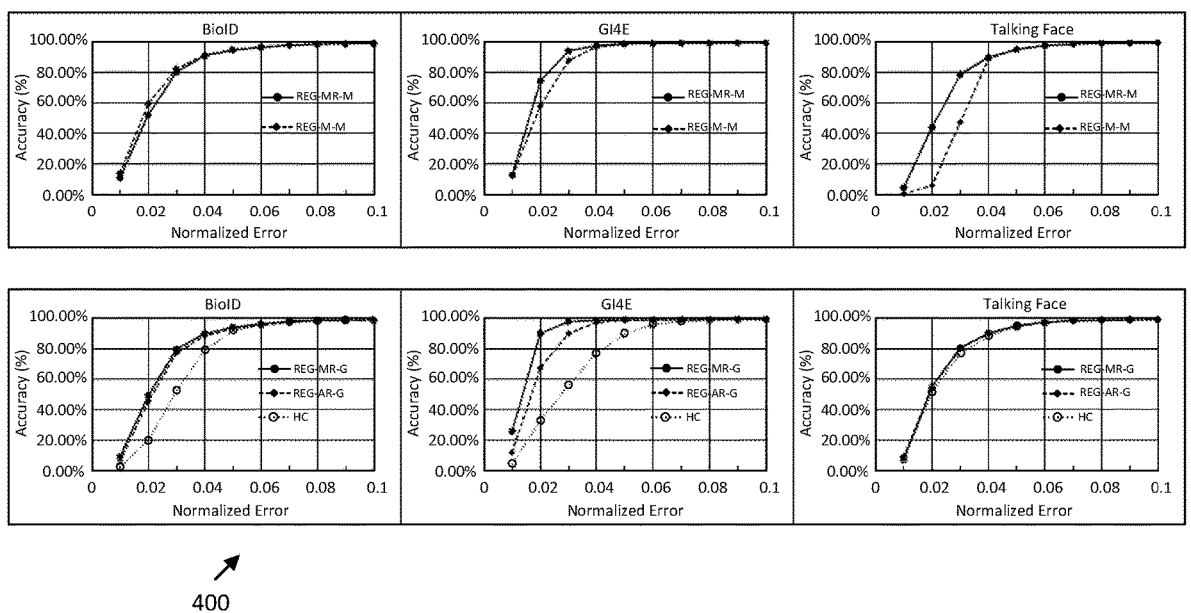
FIG. 4 is set of graphs showing quantitative evaluation.

FIG. 4 top shows that for errors below 0.05, for the two high-res datasets (GI4E and Talking Face), circle refinement leads to significant boost in accuracy. This is particularly apparent on the Talking Face dataset, where the accuracy for e≤0.025 increased from 18.70% to 65.78%. For the BioID dataset, foregoing refinement is marginally better. This is in line with our previous observation, and is likely due to the low resolution and poor quality of the images. Our method achieves state of the art performance across all the three datasets. In particular, for e≤0.05 REG-MR-M (REG-M-M) achieves the accuracy of 95.07% (95.27%) on BioID, 99.27% (99.03%) on GI4E, and 95.68% (95.62%) on the Talking Face dataset.

Recall that the evaluation is restricted to images where facial alignment passed verification. On GI4E and Talking Face datasets combined, only one image failed verification. However, on BioID 62 images failed verification compared to only 6 images where a face was not detected. Evaluating REG-MR-M on all images with a detected face yields a performance of 67.19% for e≤0.025, 94.19% for e≤0.05, 99.47% for e≤0.1, and 100% for e≤0.25, which is only marginally worse than the method with facial verification and still out-performs the competition. Future improvements to facial feature alignment will remove this gap in performance. Table 1 summarizes the results. In Table 1, values are taken from respective papers. For [10], we used the implementation provided by the authors with eye regions from facial feature alignment. *=value estimated from authors' graphs. Performance of REG-MR-G on GI4E is omitted since GI4E was used for training. The three best methods in each category are marked with superscripts 1, 2, and 3.

Next, we compare the performance of the automatically trained regressor (REG-AR-G) to the hand-crafted approach that generated its annotations (HC), as well as to REG-MR-G trained on manually annotated GI4E data. The results are shown in FIG. 4 bottom and are included in Table 1. Observe that REG-AR-G outperforms the hand-crafted method on both the train (GI4E) and the test (BioID and Talking Face) sets. Moreover, on the test sets its performance is close to REG-MR-G.

TABLE 1

| Method | e <0.025 | e <0.05 | e <0.1 | e <0.25 |
|---|---|---|---|---|
| | | BioID Dataset | | |
| REG-MR- | 68.13%[3] | 95.07%[2] | 99.59%[3] | 100%[1] |
| REG-M-M | 74.3%[1] | 95.27%[1] | 99.52% | 100%[1] |
| REG-MR- | 68.75%[2] | 94.65%[3] | 99.73%[2] | 100%[1] |
| REG-AR-G | 64.15% | 93.9% | 99.79%[1] | 100%[1] |

TABLE 1-continued

| Method | e <0.025 | e <0.05 | e <0.1 | e <0.25 |
|---|---|---|---|---|
| HC | 36.26% | 92.39% | 99.38% | 100%[1] |
| Timm [21] | 38%* | 82.5% | 93.4% | 98% |
| Valenti [23] | 55%* | 86.1% | 91.7% | 97.9% |
| Zhou [27] | 50%* | 93.8% | 99.8% | 99.9%[2] |
| Ahuja [3] | NA | 92.06% | 97.96% | 100%[1] |
| Markuš[16] | 61%* | 89.9% | 97.1% | 99.7%[3] |
| GI4E Dataset | | | | |
| REG-MR- | 88.34%[1] | 99.27%[1] | 99.92%[1] | 100%[1] |
| REG-M-M | 77.57%[3] | 99.03%[2] | 99.92%[1] | 100%[1] |
| REG-AR-G | 83.32%[2] | 99.27%[1] | 99.92%[1] | 100%[1] |
| HC | 47.21% | 90.2% | 99.84%[2] | 100%[1] |
| ELSE [10] | 49.8% | 91.5%[3] | 97.17%[3] | 99.51%[2] |
| Anjith [11] | NA | 89.28% | 92.3% | NA |
| Talking Face Dataset | | | | |
| REG-MR- | 65.78% | 95.68%[2] | 99.88%[1] | 99.98%[1] |
| REG-M-M | 18.7% | 95.62%[3] | 99.88%[1] | 99.98%[1] |
| REG-MR- | 71.56%[1] | 95.76%[1] | 99.86%[2] | 99.98%[1] |
| REG-AR-G | 71.16%[2] | 95.46% | 99.82% | 99.98%[1] |
| HC | 67.74%[3] | 94.86% | 99.84%[3] | 99.98%[1] |
| ELSE [10] | 59.26% | 92% | 98.98% | 99.94%[2] |
| Ahuja [3] | NA | 94.78% | 99% | 99.42%[3] |

Qualitative Evaluation

Figure 5:
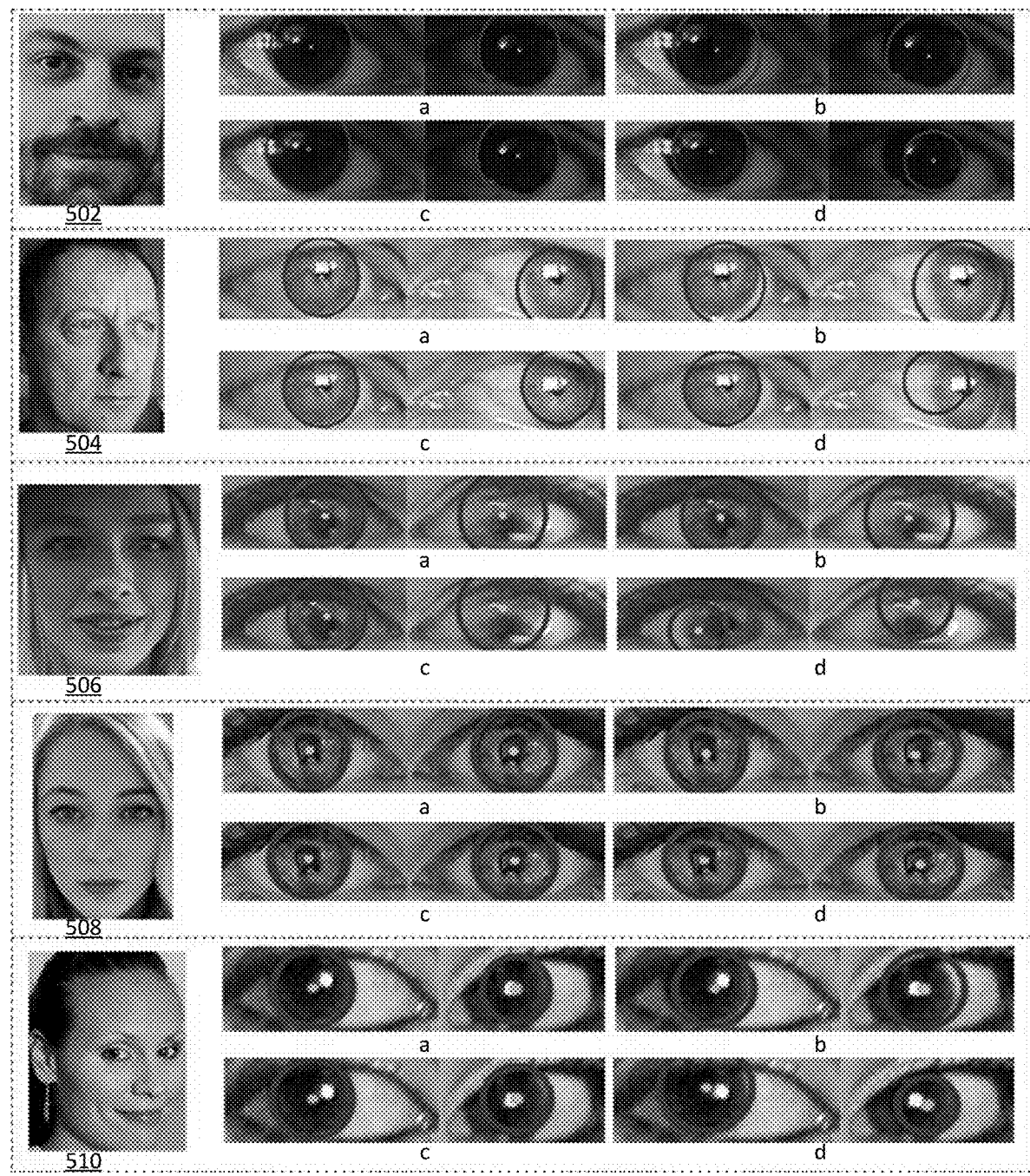
FIG. 5 are photographic examples of qualitative evaluation.

For qualitative evaluation we compare the performance of REG-MR-G, REG-M-G, REG-AR-G, and HC. For consistency, all regressors were trained on GI4E. FIG. 5 shows selected results, where for each image 502, 504, 506, 508 and 510 there is shown the results of (a) REG-MR-G, (b) REG-M-G, (c) REG-AR-G, and (d) HC. The first four examples (502, 504, 506 and 508) illustrate the increased accuracy when using circle refinement. Furthermore, the first three examples (502, 504 and 506) illustrate a failure of HC on at least one eye while REG-AR-G, which was trained using HC, is performing well. Finally, in the provided examples 502, 504, 506, 508 and 510 we observe no significant difference in quality between the manually and the automatically trained regressors, as well as their ability to cope with challenging imaging conditions such as poor lighting (1st and 3rd images) and motion blur (left eye in 3rd image).

One failure mode of our approach is when the pupils are near the eye corners. This is especially true for the inner corner (left eye in the last example of FIG. 5), where the proximity to the nose creates strong edges that likely confuse the HoG descriptor. The lack of training data with significant face rotation may also be a contributing factor. Training on more rotated faces, as well as using the skin color to down weigh the gradients from the nose, should help alleviate this issue.

Applications

The newly disclosed approaches for eye center localization and tracking in images and videos may be useful in a number of applications, including but not limited to biometrics, colored contact lens visualization, eye tracking, and gaze tracking.

Figure 6:
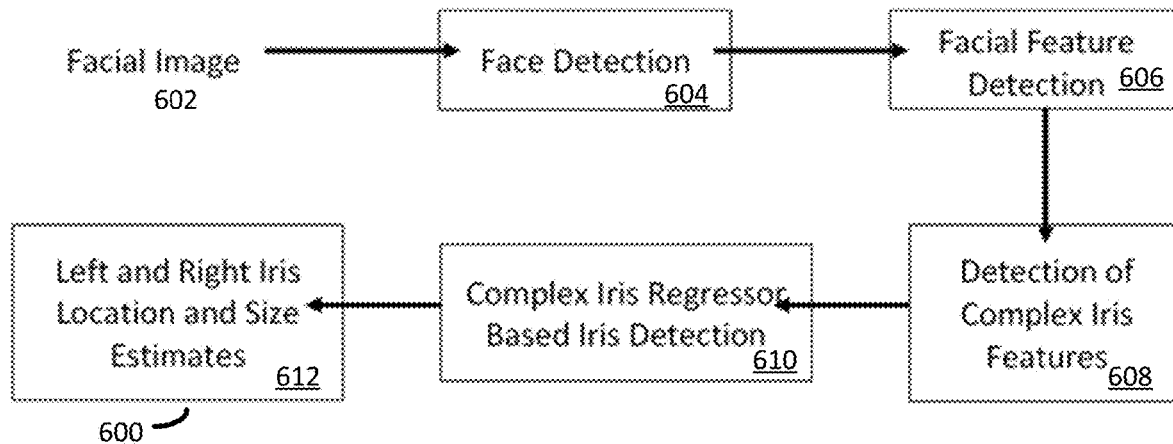
FIG. 6 is a flowchart showing method to determine left and right iris location and size estimates.
Figure 7:
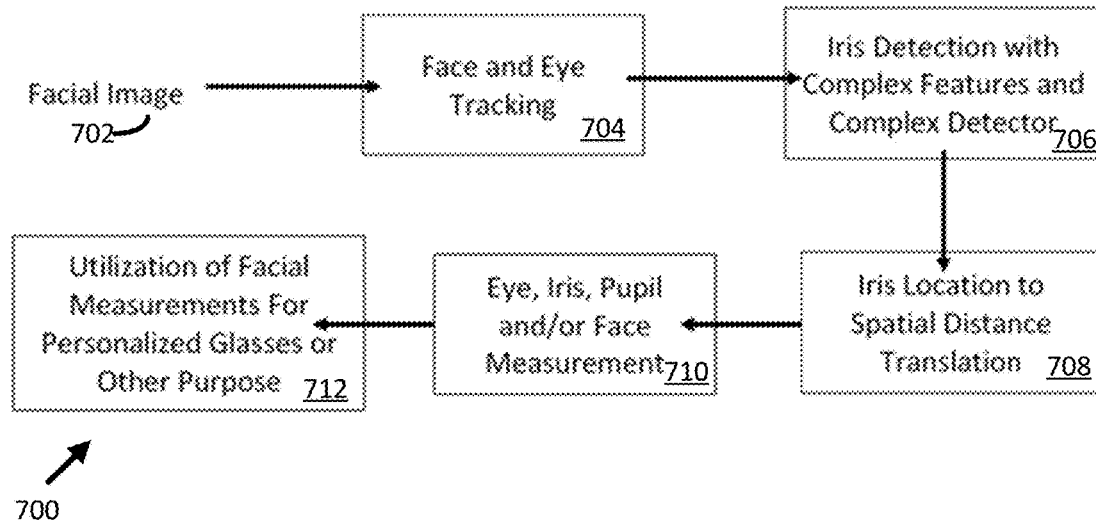
FIG. 7 is a flowchart showing method to use facial measurements for personalized glasses or other purpose.

In one embodiment, the novel iris detection and tracking methods and systems may be used in a method and system for the purposes of estimating the distance between the eyes and estimating the size of the iris and/or the pupils. FIG. 6 shows a flow chart of operations 600 to determine left and right iris location and size estimates of irises in a facial image 602. It is apparent that initial steps 604, 606, 608 and 610 of this method are similar to steps of the approaches for eye center localization and tracking disclosed above herein to determine respective iris locations (612). In addition, this method 600 then utilizes the distribution of the known size of the irises, the distribution of the size of the eyes, the distribution of the distance between the eyes, and other probabilistic information about the facial elements to calibrate the pixel distances in images. The resulting (accurate) pixel distances determined from the images are then used to estimate actual physical distances (for example, in inches or centimeters) such as via a translation operation. Such measurements of physical distances may have application for any one or more of biometrics (not shown), creating custom personalized glasses that perfectly fit the face of a user (shown in FIG. 7) and estimating the size of the pupils (shown in FIG. 7). FIG. 7 shows a flow chart of operations 700 to determine from a facial image 702, for example, various face measurements (710) and to utilize face measurements (e.g. at 712). Operations 704 and 706 are similar to operations 604-610 and operation 708 is similar to operation 612 as described with reference to FIG. 6.

Pupil size estimation, in one embodiment, may be used to indicate the presence of or measure the level of intoxication (or other impairment) of a patient in a medical setting. The size of the pupil in millimeters is a standard medical evaluation criteria in hospitals. Pupil size can be estimated from the detected iris location by first detecting the inner black region within the iris (which would be the pupil), and finding the diameter of the boundary between the black pupil region and the rest of the iris. The ratio of the diameter of this region to the diameter of the iris, measured in pixels, would be the same as the ratio of the pupil diameter to the iris diameter measured in actual distance units (such as millimeters). If we assume that the diameter of the iris is a fixed known value (which for most people would be in the 11 mm to 12 mm range), then knowing the pupil-iris-ratio would tell us the diameter of the pupil.

Figure 8:
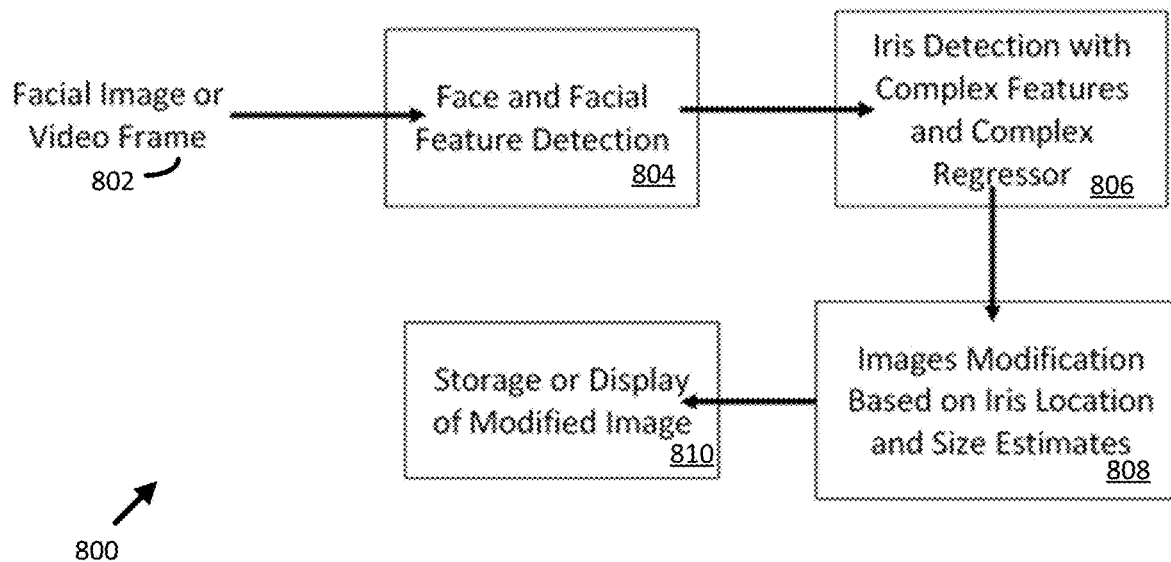
FIGS. 8 and 9 are respective flowcharts showing methods to use facial image modification with updated iris image.

In another embodiment, the newly disclosed iris detection and tracking method may be combined with a visualization layer to display eye color changes or effects such as contact lenses. The visualization layer may be overlayed or superimposed on the iris in the original image(s) and displayed to a user (FIG. 8). In this embodiment, the particular placement of the contact lens (e.g. image overlay) is restricted by (i.e. is responsive to) the bottom and top eyelid edges of the eye or eyes in the images. By placing an image layer superimposed on the iris region, or alternatively, by altering the colors in the iris region, while masking the parts of the iris that are occluded by the top and bottom eyelids, it may be visually demonstrated how a particular color or contact lens style would look on the particular image or video of a subject person (e.g. a user, client of a user, etc.). This allows subjects to try-before-they-buy different contact lens styles and colors. FIG. 8 is a flowchart of operations 800 to store or display a modified image (810) of a facial image or video frame 802. Operations 804 and 806 are similar to operations 604, 606 and 608. Operations 808 include determining the size and location of a features such as an iris (similar to operation 612) and modify the facial image or video frame 802 such as my applying a visualization layer using determined size and location.

Figure 9:
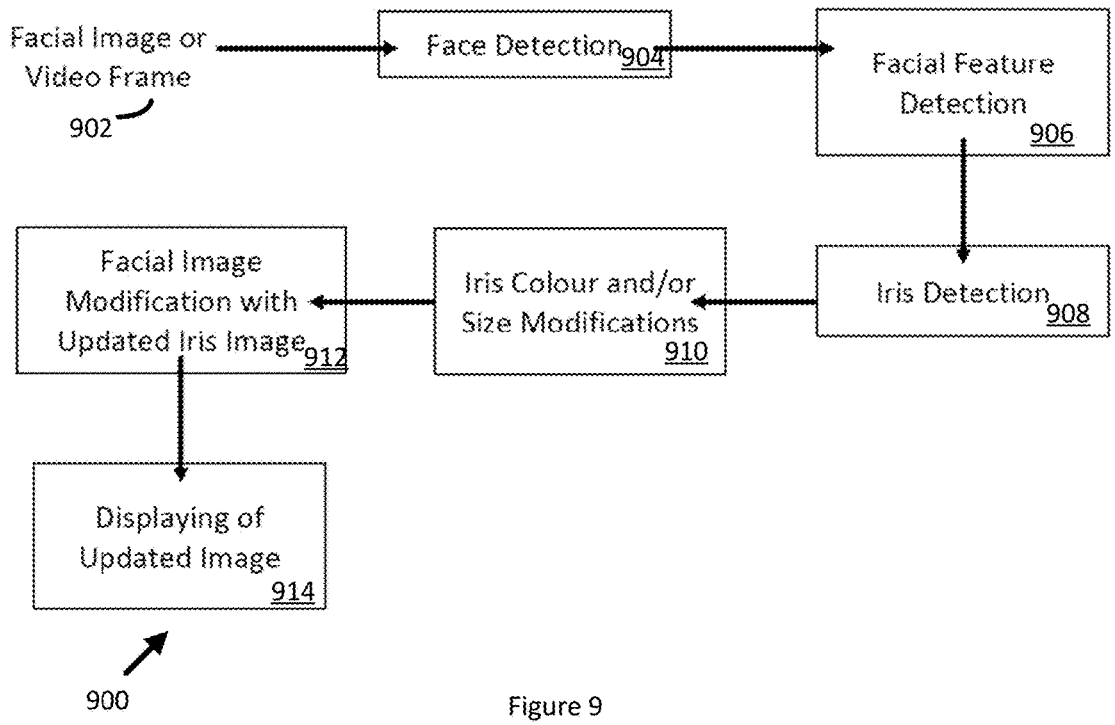

Applying a visualization layer using the iris detection can also be extended to other iris effects including increasing the size of the iris or reducing or reshaping the iris region, again by either placing an alternative iris image on top, or by warping the iris region of the image or video frame. In this embodiment as depicted (e.g. operations 900 of FIG. 9 where steps 904-910 are similar to operations 804-810), some of the initial iris determination steps may be simplified (as shown). At 912, the facial image or video frame 902 is modified with the updated iris image, which may include warping, etc. It is understood that they may be performed with complex feature detection and by using complex detector regressors as previously described. In any of the embodiments described herein a modified image may be stored or displayed, or both stored and displayed. Similarly any modified image may be stored, displayed and/or communicated.

Figure 10:
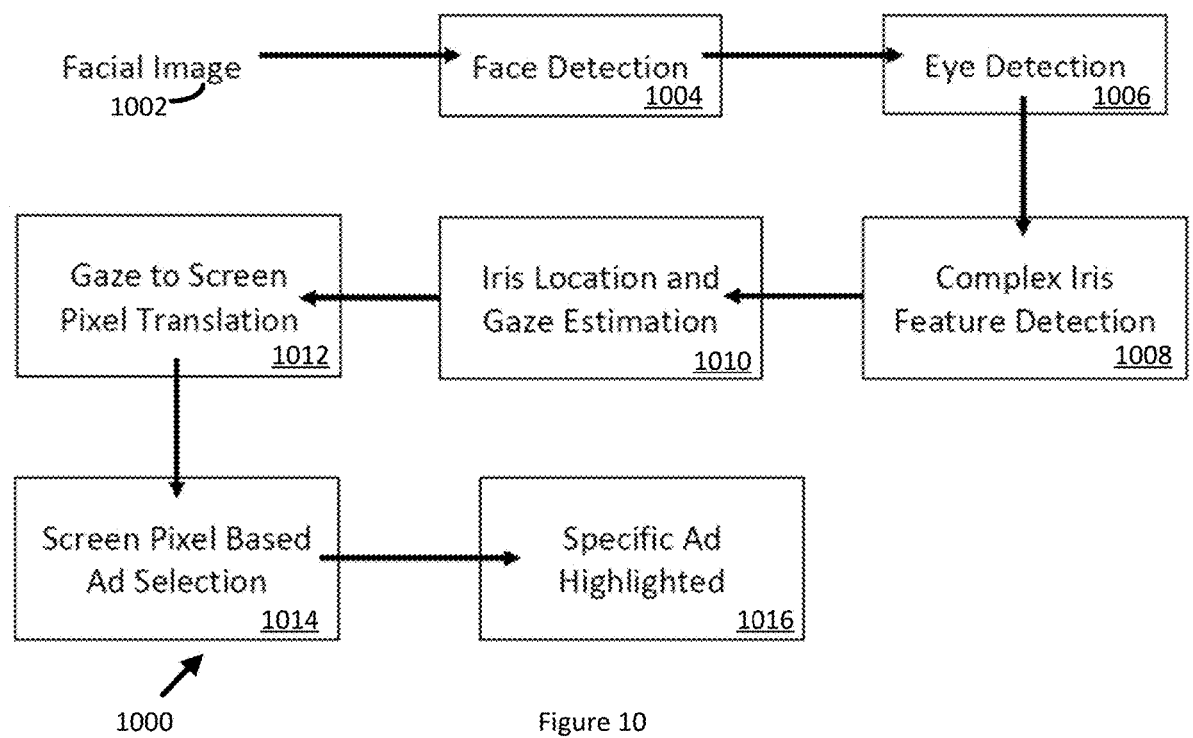
FIG. 10 is a flowchart showing a method for gaze-based user interface display.

In another embodiment, the newly disclosed iris detection and tracking is used to track the iris region within the eyes, and in conjunction with a pose estimation and facial tracking method, it is used to estimate the gaze direction of the eyes (FIG. 10). FIG. 10 is a flow chart of operations 1000. Steps 1004, 1006 and 1008 are similar to those described previously for operation on a facial image 1002 (e.g. a facial image which may include a video image is an example of an image source in each of the operations described in this document). In the this embodiment, as an example, the facial image may be from a camera of a user device such as a handheld mobile device (e.g. a smartphone) or from a personal computer with a display screen and camera set up for streaming video for interactive gaming or calling to other users, etc.

In this embodiment of FIG. 10, the iris detection and tracking, along with eye detection and tracking, face detection and tracking, and facial pose detection and tracking, are used along with information about the camera to screen relationship (which can be hardcoded or obtained through passive or active calibration) to estimate a particular location on a screen (e.g. step 1012) that the person in the image or video is looking at.

Figure 11:
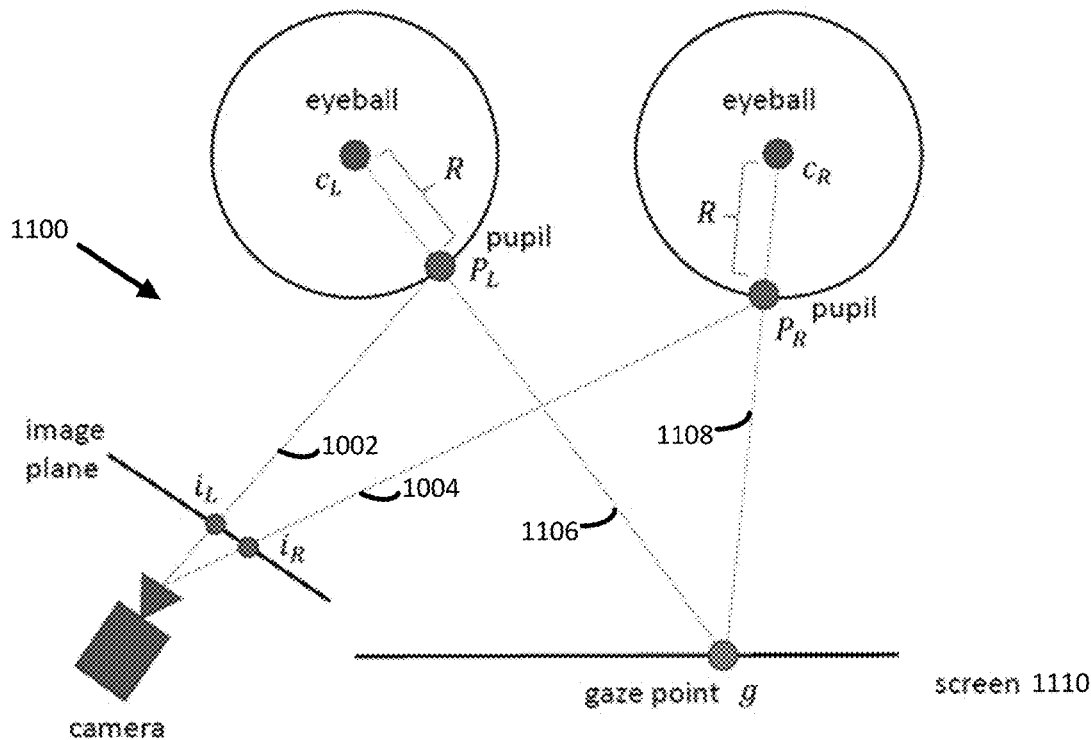
FIG. 11 is a flowchart showing environment and parameters for a method of gaze estimation.

Gaze can be estimated geometrically if the iris location in the image, as well as eyeball locations in 3D space and their sizes, are known. FIG. 11 illustrates this geometry 1100, where 3D pupil positions are found by intersecting rays 1102 and 1104 going through the irises (having pupils $P_L$ and $P_R$) with their respective eyeballs. Subsequently, gaze vectors (respective lines $P_L$-$c_L$ and $P_R$-$c_R$, each of length R) are formed by connecting the pupils $P_L$ and $P_R$ with their respective eyeball centers $c_L$ and $c_R$. Finally, the gaze point g on the monitor can be recovered by intersecting the gaze vectors (extended lines 1106 and 1108) with the monitor plane (screen 1110).

To achieve the above, we need to know the 2D iris positions in the image and the eyeball locations (and size) in 3D space relative to the camera. The former was described earlier. The latter can be obtained as follows. Assuming that we know the eyeball locations with respect to the head, which can be obtained through a calibration process, what remains is to recover the position of the head with respect to the camera. To do so, a standard approach is to establish 2D-to-3D point correspondences between 2D points on the image of the head and 3D points on the surface of the head. Then pose can be estimated by solving the PnP (Perspective-n-Point) problem. To establish such correspondences we estimate the locations of several facial features (such as eye corners, nose tip, and mouth corners) in the image using a cascaded regression framework, similar to the one used for iris center estimation. We manually mark the same features on a generic 3D head model. The process of 3D pose estimation given 2D-to-3D point correspondences is well understood in the art. The resulting correspondences are used to recover the 3D pose of the head, which in turn is used to compute the pose of the eyeballs with respect to the camera.

This gaze location is especially useful in creating gaze tracking based user interfaces, and gaze-based effects including advertisements (e.g. steps 1014 and 1016). Gaze-based user interface triggered effects may present specific advertisements or promotions when a user glances at a specific product for more than a specific duration. Other triggered user interface effects may be to automatically enlarge text or an image or perform some other effect. By way of an example, an array or other distribution of object images may be displayed on the screen in respective regions. Gaze based detection may be used to determine if a user is staring at one region for a sufficient duration. Then, automatically, the user interface may be modified (triggered) to show various effects such as different views (images) of the object, an enlargement of the image (e.g. overlaid on the background of the array/distribution) or more text details of the object, invoke a form or other user dialogue in respect of the object. Detecting the user's gaze away from the effect may invoke the user interface to remove the effect applied. Though visual effects are described audible or other effects may be triggered.)

It will be understood that the various methods and systems described herein relate to computer systems and methods. One or more processing units may execute instructions (software) stored by a (non-transient) storage device such as a memory device, ROM, disk, etc. to perform the methods and/or configure a computing device or other device. Such a computing device may be a PC, laptop, workstation, smartphone, kiosk, server or other computing device having one or processing units coupled for communication with a storage device (e.g. memory or any other storage device (e.g. disc, solid state device, etc.) storing the instructions. The computing device may be another type of device such as a camera itself.

The computing device or other device may have a display device, various input, output or I/O devices such as a camera or optical sensor to input an image source for analysis and/or for defining training data. The computing device or other device may have a communication subsystem for communicating with other devices, whether by wired or wireless means.

It is understand that an image for analysis (or training) by the methods and systems described herein may be a still image or a frame of a video. More than one image source may be analyzed such as a plurality of images. These may be successive images or selected images of a video, for example.

In some configurations, there may be a user computing device coupled for communication with a remote computing device. The user computing device may provide the image source for analysis by the remote computing device and receive a result. The remote computing device may be a cloud device/service.

It is understood that computer program product aspects are disclosed herein where a device (e.g. a storage device) stores instructions such as in a non-transient manner, that are readable and executable by a processing unit to configure a device to perform any of the method aspects disclosed herein.

These and other aspects will be apparent to a person of ordinary skill in the art from the examples herein. Teachings in respect of any one example or embodiment herein may be combined with the teachings of any other example or embodiment.

REFERENCES

[1] Bioid dataset. https://www.bioid.com/About/BioID-Face-Database.

[2] Talking face dataset. http://www-prima.inrialpes.fr/FG-net/data/01-TalkingFace/talking_face.html.

[3] K. Ahuja, R. Banerjee, S. Nagar, K. Dey, and F. Barbhuiya. Eye center localization and detection using radial mapping. In *Image Processing (ICIP), 2016 IEEE International Conference on*, pages 3121-3125. IEEE, 2016.

[4] E. Antonakos, J. Alabort-i Medina, G. Tzimiropoulos, and S. P. Zafeiriou. Feature-based lucas-kanade and active appearance models. *IEEE Transactions on Image Processing*, 24(9):2617-2632, 2015.

[5] M. Ariz, J. J. Bengoechea, A. Villanueva, and R. Cabeza. A novel 2 d/3 d database with automatic face annotation for head tracking and pose estimation. *Computer Vision and Image Understanding*, 148:201-210, 2016.

[6] X. Cao, Y. Wei, F. Wen, and J. Sun. Face alignment by explicit shape regression. *International Journal of Computer Vision*, 107(2):177-190, 2014.

[7] J. Daugman. How iris recognition works. *IEEE Transactions on circuits and systems for video technology*, 14(1):21-30, 2004.

[8] P. Dollár, Z. Tu, P. Perona, and S. Belongie. Integral channel features. 2009.

[9] W. Fuhl, T. Kübler, K. Sippel, W. Rosenstiel, and E. Kasneci. Excuse: Robust pupil detection in real-world scenarios. In *International Conference on Computer Analysis of Images and Patterns*, pages 39-51. Springer, 2015.

[10] W. Fuhl, T. C. Santini, T. Kübler, and E. Kasneci. Else: Ellipse selection for robust pupil detection in real-world environments. In *Proceedings of the Ninth Biennial ACM Symposium on Eye Tracking Research & Applications*, pages 123-130. ACM, 2016.

[11] A. George and A. Routray. Fast and accurate algorithm for eye localization for gaze tracking in low-resolution images. *IET Computer Vision*, 10(7):660-669, 2016.

[12] D. W. Hansen and Q. Ji. In the eye of the beholder: A survey of models for eyes and gaze. *IEEE transactions on pattern analysis and machine intelligence*, 32(3):478-500, 2010.

[13] T. Kawaguchi, D. Hidaka, and M. Rizon. Detection of eyes from human faces by hough transform and separability filter. In *Image Processing, 2000. Proceedings. 2000 International Conference on*, volume 1, pages 49-52. IEEE, 2000.

[14] V. Kazemi and J. Sullivan. One millisecond face alignment with an ensemble of regression trees. In *Proceedings of the IEEE Conference on Computer Vision and Pattern Recognition*, pages 1867-1874, 2014.

[15] D. Li, D. Winfield, and D. J. Parkhurst. Starburst: A hybrid algorithm for video-based eye tracking combining feature-based and model-based approaches. In *Computer Vision and Pattern Recognition-Workshops, 2005. CVPR Workshops. IEEE Computer Society Conference on*, pages 79-79. IEEE, 2005.

[16] N. Markuš, M. Frljak, I. S. Pandžió, J. Ahlberg, and R. Forchheimer. Eye pupil localization with an ensemble of randomized trees. *Pattern recognition*, 47(2):578-587, 2014.

[17] S. Ren, X. Cao, Y. Wei, and J. Sun. Face alignment at 3000 fps via regressing local binary features. In *Proceedings of the IEEE Conference on Computer Vision and Pattern Recognition*, pages 1685-1692, 2014.

[18] E. Skodras and N. Fakotakis. Precise localization of eye centers in low resolution color images. *Image and Vision Computing*, 36:51-60, 2015.

[19] L. Świrski, A. Bulling, and N. Dodgson. Robust real-time pupil tracking in highly off-axis images. In *Proceedings of the Symposium on Eye Tracking Research and Applications*, pages 173-176. ACM, 2012.

[20] D. Tian, G. He, J. Wu, H. Chen, and Y. Jiang. An accurate eye pupil localization approach based on adaptive gradient boosting decision tree. In *Visual Communications and Image Processing (VCIP), 2016*, pages 1-4. IEEE, 2016.

[21] F. Timm and E. Barth. Accurate eye centre localization by means of gradients. *VISAPP*, 11:125-130, 2011.

[22] K. Toennies, F. Behrens, and M. Aurnhammer. Feasibility of hough-transform-based iris localization for real-time-application. In *Pattern Recognition, 2002. Proceedings. 16th International Conference on*, volume 2, pages 1053-1056. IEEE, 2002.

[23] R. Valenti and T. Gevers. Accurate eye center location through invariant isocentric patterns. *IEEE transactions on pattern analysis and machine intelligence*, 34(9):1785-1798, 2012.

[24] E. Wood and A. Bulling. Eyetab: Model-based gaze estimation on unmodified tablet computers. In *Proceedings of the Symposium on Eye Tracking Research and Applications*, pages 207-210. ACM, 2014.

[25] X. Xiong and F. De la Torre. Supervised descent method and its applications to face alignment. In *Proceedings of the IEEE conference on computer vision and pattern recognition*, pages 532-539, 2013.

[26] X. Zhang, Y. Sugano, M. Fritz, and A. Bulling. Appearance-based gaze estimation in the wild. In *Proc. of the IEEE International Conference on Computer Vision and Pattern Recognition (CVPR)*, June 2015.

[27] M. Zhou, X. Wang, H. Wang, J. Heo, and D. Nam. Precise eye localization with improved sdm. In *Image Processing (ICIP), 2015 IEEE International Conference on*, pages 4466-4470. IEEE, 2015.

What is claimed is:

1. A device comprising a processing unit coupled to a storage device storing instructions, which instructions, when executed by the processing unit, configure the device to provide components to determine eye center localization in an image source, the components comprising:
   a facial feature detector to detect facial features of a face in the image source, the face including a pair of eyes each having an iris;
   a cascade regression of forests engine (CRFE) defined according to machine learning to analyze the image source, the CRFE using the facial features and successively analyzing the image source in a cascade of regression forests to determine a rough estimate of eye center localization; and
   a circle fitter to refine the rough estimate of eye center localization by performing a circle fitting for each iris to determine the eye center localization for use to apply a visualization, wherein the instructions configure the device to provide an image source modifying component to modify the image source by applying the visualization to update each iris of the image source for display.

2. The device of claim 1 wherein the CRFE estimates the eye center localization of the pair of eyes jointly such that a shape S used by the CRFE comprises eye centers, the CRFE successively refining the shape S in respective levels of the cascade of regression forests, with each level in the cascade evaluating by a current regressor a respective current shape S as determined by a previous regressor in a previous level of the cascade of regression forests.

3. The device of claim 2 where a regression forest at each level of the cascade of regression forests is defined in accordance with:
   extracted HoG (Histogram of oriented Gradients) features centered on each current eye center of current shape S;
   a respective N-dimensional feature vector defined in responsive to the HoG features; at each regression tree decision node, a generated pool of K pairwise HoG features where each pair in the generated pool is determined by random choice of an eye, two of the N-dimensions and a threshold where a binary HoG difference feature is computed as a thresholded difference between the two of the N-dimensions, where N and K are real whole numbers; and
   at each decision node, a store of an updated shape vector comprising coordinates of each eye center.

4. The device of claim 1, wherein the circle fitter performs the circle fitting, for each iris, by:
   defining an initial circle from a respective eye center determined by the CRFE and an initial radius;
   extracting candidate iris edge points from edge points adjacent to a boundary of the initial circle, the boundary defined by circle points; and
   fitting the circle using the candidate iris edge points;
   wherein candidate iris edge points are extracted by:
      restricting the extracting by examining only circle points taken from a portion of each initial circle boundary; and
      for each respective circle point taken, evaluating a respective score assigned to the respective circle point and respective points adjacent to the respective circle point, the respective points adjacent comprising points along a scan line centered on the respective circle point and directed toward a center of the initial circle, such that only a highest scoring point along the scan line is selected as a candidate iris edge point.

5. The device of claim 1 wherein the instructions configure the device to provide the image source modifying component to modify the image source in response to an iris location determined by the eye center localization; and wherein the instructions configure the device to communicate, store, and/or display the image source as modified.

6. The device of claim 5 wherein the image source modifying component modifies the image source by changing an iris colour.

7. The device of claim 6 wherein the image source modifying component simulates a contact lens or other effect applied to the iris.

8. The device of claim 5 wherein the image source modifying component further modifies one or more facial features of the face in addition to modifying one or more irises.

9. A computer implemented method to determine eye center localization in an image source, the method executed by a processing unit of a computing device and comprising:
   detecting facial features of a face in the image source, the face including a pair of eyes each having an iris;
   analyzing the image source by a cascade regression of forests engine (CRFE), the CRFE using the facial features and successively analyzing the image source in a cascade of regression forests to determine a rough estimate of eye center localization; and
   refining the rough estimate of eye center localization by performing a circle fitting for each iris to determine the eye center localization for use to apply a visualization, wherein the method further comprises modifying the image source by applying the visualization to update each iris of the image source for display.

10. The method of claim 9 wherein the CRFE estimates the eye center localization of the pair of eyes jointly such that a shape S used by the CRFE comprises eye centers, the CRFE successively refining the shape S in respective levels of the cascade of regression forests, with each level in the cascade evaluating by a current regressor a respective current shape S as determined by a previous regressor in a previous level of the cascade of regression forests.

11. The method of claim 10 comprising performing facial feature alignment to establish an initial estimate of the shape S to initiate a first level of the cascade of regression forests in the CRFE.

12. The method of claim 11 comprising determining and using four eye corners to construct the initial estimate of the shape S and normalizing the initial estimate.

13. The method of claim 11, wherein a regression forest at each level of the cascade of regression forests is defined in accordance with:
   extracted HoG (Histogram of oriented Gradients) features centered on each current eye center of current shape S;
   a respective N-dimensional feature vector defined in response to the HoG features;
   at each regression tree decision node, a generated pool of K pairwise HoG features where each pair in the generated pool is determined by random choice of an eye, two of the N-dimensions and a threshold where a binary HoG difference feature is computed as a thresholded difference between the two of the N-dimensions, where N and K are real whole numbers; and
   at each decision node, a store of an updated shape vector comprising the coordinates of each eye center.

14. The method of claim 9 wherein performing the circle fitting comprises, for each iris:
   defining an initial circle from a respective eye center determined by the CRFE and an initial radius;
   extracting candidate iris edge points from edge points adjacent to a boundary of the initial circle, the boundary defined by circle points; and
   fitting the circle using the candidate iris edge points;
   wherein candidate iris edge points are extracted by:
      restricting the extracting by examining only circle points taken from a portion of each initial circle boundary; and
      for each respective circle point taken, evaluating a respective score assigned to the respective circle point and respective points adjacent to the respective circle point, the respective points adjacent comprising points along a scan line centered on the respective circle point and directed toward a center of the initial circle, such that only a highest scoring point along the scan line is selected as a candidate iris edge point.

15. The method of claim 14 wherein the respective score assigned to each point on a scan line is equal to a dot product between a gradient and outwards-facing circle normal.

16. The method of claim 14 wherein the portion of each initial circle boundary comprises an arc between ±45° and an arc between 135° and 225° measured from the center of the initial circle.

17. The method of claim 14 wherein a length of the scan line is 30% of a length of the initial radius and wherein the initial radius is defined as a portion of a distance between each respective eye center.

18. A method to simulate reality comprising:
    modifying an image source comprising a facial image or video frame by applying a visualization to update an iris of the image source for display;
    wherein, the iris is determined by:
    detecting facial features of a face in the image source, the face including the iris;
    successively analyzing the image source by a cascade regression of forests engine (CRFE), the CRFE using the facial features to determine a rough estimate of eye center localization of the iris; and
    refining the rough estimate of eye center localization by performing a circle fitting for the iris to determine the eye center localization for use to apply the visualization.

19. The method of claim 18 wherein the CRFE estimates the eye center localization of a pair of eyes of the face jointly such that a shape S used by the CRFE comprises eye centers, the CRFE successively refining the shape S in respective levels of the cascade of regression forests, with each level in the cascade evaluating by a current regressor a respective current shape S as determined by a previous regressor in a previous level of the cascade of regression forests.

20. The method of claim 18, wherein the circle fitting comprises:
    defining an initial circle from an eye center of the iris as determined by the CRFE and an initial radius;
    extracting candidate iris edge points from edge points adjacent to a boundary of the initial circle, the boundary defined by circle points; and
    fitting the circle using the candidate iris edge points.

21. The method of claim 20, wherein candidate iris edge points are extracted by:
    restricting the extracting by examining only circle points taken from a portion of each initial circle boundary; and
    for each respective circle point taken, evaluating a respective score assigned to the respective circle point and respective points adjacent to the respective circle point, the respective points adjacent comprising points along a scan line centered on the respective circle point and directed toward a center of the initial circle, such that only a highest scoring point along the scan line is selected as a candidate iris edge point.

22. The method of claim 18 comprising defining the visualization to modify the image source, the modifying comprising at least one of:
    a. changing a colour, size and/or shape of the iris; and
    b. simulating a contact lens or other effect applied to the iris.

* * * * *